Figure 2:
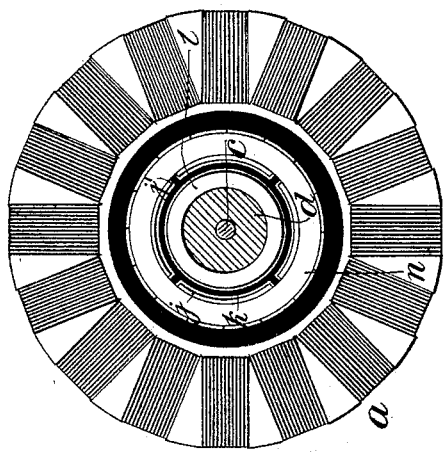

No. 607,451. Patented July 19, 1898.
A. B. McMILLAN.
ELECTROMAGNETIC MOTOR.
(Application filed July 7, 1897.)
(No Model.) 2 Sheets—Sheet 1.

WITNESSES: INVENTOR

No. 607,451. Patented July 19, 1898.
A. B. McMILLAN.
ELECTROMAGNETIC MOTOR.
(Application filed July 7, 1897.)
(No Model.) 2 Sheets—Sheet 2.
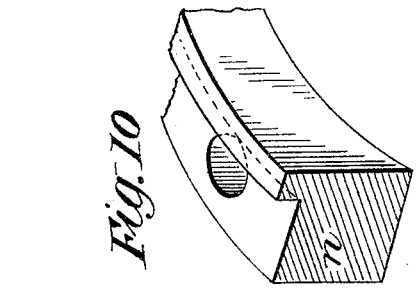
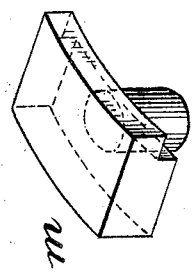
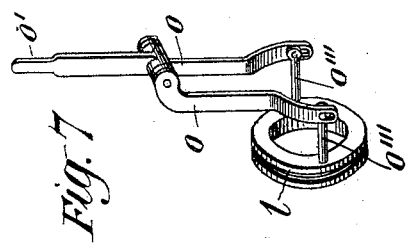
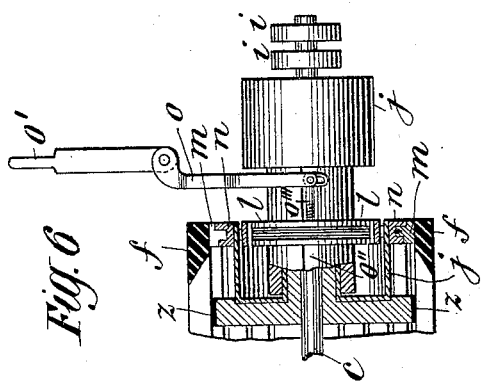
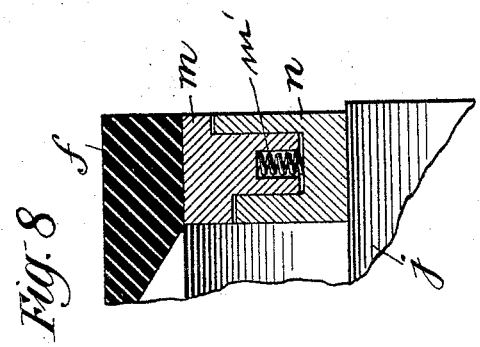
WITNESSES:
INVENTOR

UNITED STATES PATENT OFFICE.

ARCHIE B. McMILLAN, OF NEW YORK, N. Y.

ELECTROMAGNETIC MOTOR.

SPECIFICATION forming part of Letters Patent No. 607,451, dated July 19, 1898.

Application filed July 7, 1897. Serial No. 643,689. (No model.)

*To all whom it may concern:*

Be it known that I, ARCHIE B. MCMILLAN, a subject of the Queen of Great Britain, residing at New York, (Brooklyn,) in the county of Kings and State of New York, have invented certain new and useful Improvements in Electromagnetic Motors, of which the following is a specification, reference being had to the drawings accompanying and forming a part of the same.

The invention which forms the subject of my present application for Letters Patent is an improvement in or applicable to electromagnetic motors and is designed to provide a means in the nature of a clutch for transmitting the power of the motor to the work to be done.

The improvement is especially applicable to motors employed in street-railway and similar work where frequent stops, starts, and variations of speed are required in that it affords a flexible and at the same time a highly efficient speed-varying device.

The necessity for some form of speed-varying mechanism for electromagnetic motors is almost universal, as otherwise it is necessary to regulate their speed by varying the current in their armatures or main circuit by means of artificial resistances, which waste in heat a large proportion of the total energy consumed. A further objection to such means of regulation is the destructive sparking at the commutator, which, like the waste of energy, is greatest at starting.

Of the various forms of speed-varying devices heretofore employed those which are purely mechanical in their construction are objectionable on account of the wear and tear of their parts and the noise and vibration incident to their operation, while the electromagnetic clutches, which are operated by or in conjunction with mechanical gearing, are open to the same objection and in addition are generally inefficient, as they consume in operation a considerable amount of current, which, so far as effective work counts, represents so much dead loss.

Starting with the well-known fact that when allowed to rotate continuously at normal speed all well-designed electric motors are automatically self-regulating and adapt themselves to all changes of load without the aid of external resistance devices, without waste of energy, and consuming current only in proportion to actual work, I have had in view, as the object of my present invention, to provide a frictionless flexible variable - speed clutch by means of which the work might be performed at any desired speed by a motor kept in continuous rotation. This object I have accomplished by utilizing the inductive influence of a rotating field upon an armature with closed circuits or, conversely, in substantially the manner hereinafter more fully described.

Figure 5:
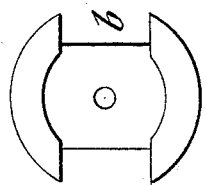
Figure 1:
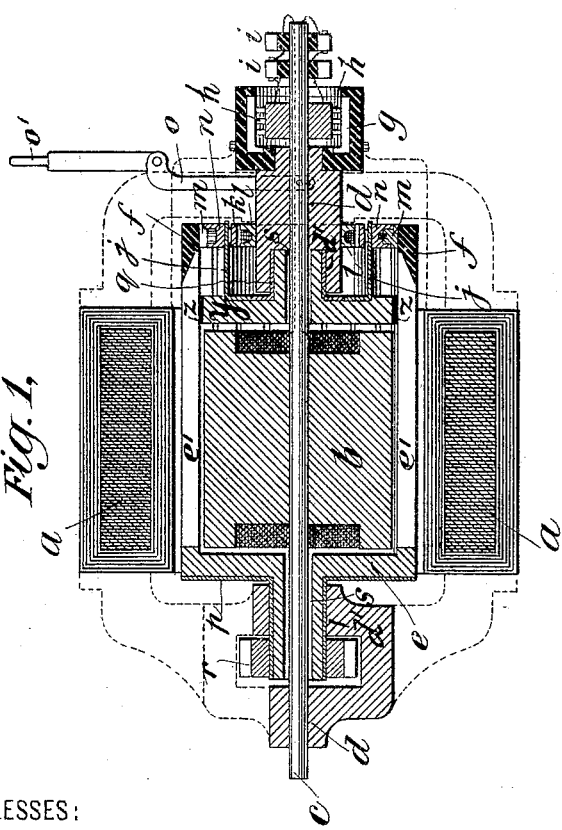
Figure 4:
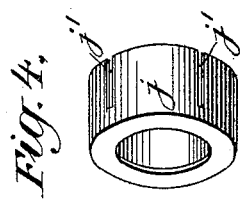
Figure 3:
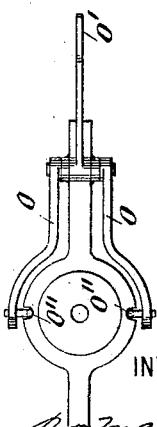

In the drawings hereto annexed, which illustrate the construction and mode of operation of apparatus embodying my improvement, Figure 1 is a central longitudinal section of a motor and clutch constructed in accordance with my invention. Fig. 2 is a cross-section of the same. Fig. 3 is a detail of the mechanism viewed from the right of Fig. 1. Figs. 4 and 5 are views of detached parts, which will be more fully hereinafter described. Fig. 6 is a view, partly in section and partly in side elevation, of the circuit-controlling devices of Fig. 1. Fig. 7 is a perspective view of a part of the said devices. Fig. 8 is a sectional view, on an enlarged scale, of the contact-making devices of Fig. 7. Figs. 9 and 10 are enlarged views in perspective of the contacts of Fig. 6.

Referring to Fig. 1, $a$ designates a cylindrical armature, and $b$ the field-magnet, of a continuous-current motor, both of which should be laminated and mounted in a frame or on supports suited to the special work for which the motor is required. In the form of apparatus now under consideration the armature is stationary and the field-magnet revolves. The latter is therefore mounted on a shaft $c$, which has its bearings at opposite sides of the frame.

The stationary commutator for the armature is designated by $g$, the rotating brushes carried by the shaft $c$ by $h$, and the continuous collecting-rings, which such forms of motor require for energizing the field, by $i\ i$.

Between the armature $a$ and field-magnet $b$, and in position to intercept the magnetic lines of the latter, is interposed a secondary armature, which in the present case is a cylindrical copper shell entirely inclosing the field-magnet and adapted to revolve in bearings independently of the main shaft. In order to prevent eddy-currents, this cylinder is slotted longitudinally in lines equidistant about its periphery and parallel with the axis of rotation, these slots being indicated by $e'$. The cylinder is cast in one piece with a head $c$, which latter is reinforced by a steel jacket $p$, that serves to strengthen it and to form a bearing-surface for the extension or sleeve thereon. The opposite end of the cylinder is likewise provided with a head $y$, which is similarly reinforced by a jacket $q$; but the head is insulated from the cylinder at $z$, being bolted thereto a short distance from its end. The end of the cylinder which projects beyond the head $y$ is beveled off to a thin edge all around to form a graduated resistance suitable for the low voltage of the conductor of the armature, and this is utilized for purposes of regulation in the following manner: A ring of non-conducting material $f$ surrounds the beveled end of the cylinder and extends slightly beyond it, the inner surfaces of the said ring and cylinder being flush. On this ring $f$ there normally bears a circuit-closer $n$, which is supported by a flanged copper cylinder $j$. (Shown detached in Fig. 4 and which is fixed to the head $y$.) The said cylinder $j$ is slotted at equidistant points, as shown in Fig. 4, to admit of the passage of pins, which rigidly connect the circuit-closer $n$ to an iron ring $k$, forming part of the magnetic circuit of an annular magnet $l$, said ring being mounted concentrically with the cylinder and adapted to follow the movement of said magnet longitudinally along the shaft and carry the circuit-closer with it.

The circuit-closer $n$ comprises a flanged ring, Figs. 6 and 10, having a series of circular recesses at equal distances around its periphery, into which fit closely the shanks of the segments $m$, Figs. 8 and 9. These segments are held in position by the flange of the ring, which flange they overlap. Their shanks are, moreover, partly hollow, and contain spiral springs $m'$, as shown in Fig. 8, which press the segment outward radially. This plan of construction is preferable to a simple copper ring or the like, for, as the parts are subject to wear, it is advisable to make some provision to compensate for it.

The annular electromagnet $l$, which is designed to magnetically control the lateral movements of the circuit-closer, is arranged to slide along the journal-bearing and is operated by the handle $o'$ of a bifurcated lever $o$, (shown detached in Figs. 3 and 7,) which is pivoted to the bearing-standard and connected with the annular magnet on opposite sides by rods $o'''$, pivoted to the arms of the lever and secured to the core of the magnet, as shown in Figs. 3 and 7. Any other suitable means for shifting the magnet or the circuit-closer may be used that will permit the circuit-closer to revolve with the secondary armature and shift it laterally along the beveled portion of the cylinder, as occasion may require.

I employ as a convenient means of mounting the rotating portions of the apparatus compound bearings $d\ d'$, each provided with two independent bearings of different diameters for the purpose of keeping the two rotating bodies separate, with clearances between them, as shown at $s\ s$. Between the two bearings at the pinion end a chamber is provided for the reception of the pinion $r$, which is keyed on the extremity of the secondary-armature sleeve and transmits the power of the motor to the work.

The apparatus above described is used and operated as follows: Assuming that the primary motor is rotated at normal speed in the direction in which it is desired that the secondary armature should rotate, then, as long as the circuit of the secondary armature remains open, the armature will be uninfluenced by the revolving field of the field-magnet $b$. To start the secondary armature in rotation, the annular magnet $l$, which may be energized from the same source as the motor or from any other suitable source, is moved inward by means of the handle $o'$, and this movement causes the circuit-closer, through the instrumentality of the iron ring $K$, to move over in contact with the end of the cylinder, closing the circuit of said cylinder at the thin end, which is the point of highest resistance. Instantly the revolving magnetic field causes a drag in the secondary armature which tends to follow the former around in the direction in which the said field-magnet is rotating. As the circuit-closer is moved farther inward, thereby decreasing the resistance of the secondary-armature circuit, the drag is increased and reaches its maximum when the circuit-closer encounters the head $y$, the secondary armature being then short-circuited. To stop the secondary armature, the lever $o'$ is merely reversed, thereby returning the annular magnet and circuit-closer to their normal positions, in which case the revolving field-magnet no longer exercises an influence on the secondary armature, so that the latter comes to rest. Thus it will be seen that the primary motor may be maintained in continuous rotation and the secondary armature flexibly and absolutely without friction clutched to it and unclutched from it and operated at any desired speed at will.

It will be observed that no current is expended in the operation of the clutch except the almost negligible quantity required to energize the annular magnet $l'$.

The direction of drag is always the same as that of the rotation of the driving element, independent of the polarity of the energizing-current therein. The amount of drag or clutching effort at any given time depends upon three factors: First, the strength of the magnetic field; second, the relative speed of rotation, and, third, the electrical resistance of the secondary armature. By varying any one of these three, therefore, and maintaining the other two constant or by any various combinations of the three the drag and speed of the driven or working shaft may be varied to any desired extent.

When unclutched, the primary motor runs light and consumes the minimum amount of energy, but when clutched its counter electromotive force falls in proportion to the load imposed upon it and the current increases in inverse proportion to the fall in the counter electromotive force, and hence in direct proportion to the load or work to be done. Thus my improvement, which is practically a clutch, a speed-reducer, and a converter of speed into power, all in one, enables me to utilize the property of self-regulation inherent in every well-designed electric motor and to obtain in variable-speed work a consumption of current in proportion to actual work done only at all loads and speeds.

As no mechanical gearing of any kind is employed, the primary shaft operates noiselessly, while its momentum is very valuable at starting of the load, effecting a considerable saving in current.

An induced current, which is reversed twice during every relative revolution and which represents the electrical equivalent of the mechanical energy expended in the drag between the driving and driven elements, is always present in the secondary armature when the latter is doing work. The induced current, like the primary, varies directly with the load and may be considered as a secondary result of the drag, not the primary cause of it, although the conditions necessary for the existence of one are the same as and must also exist for the other. If, however, the self-induction of the secondary armature is sufficiently high to cause the induced current generated by one pole of the field-magnet to lag to such an angle as to be overtaken by the reversing-pole, the induced current then, by its inductive effect upon such pole, exerts primarily a momentary torque or drag on the armature in the reverse direction to the effective and useful drag of the first pole and will also weaken the magnetic field by its counteracting effect. These counter effects would be most prominent at starting under load, owing to the high relative speed of the primary and the heavy induced current in the secondary armature and would decrease with the relative speed and induced current and eventually disappear as the speed of the secondary armature increased. Therefore, the higher the relative speed the lower the self-induction of the secondary armature must be.

The self-induction of the secondary armature $e$ in Fig. 1 is practically neutralized by the primary current in the armature $a$. The currents in both armatures vary directly with the load. They are always approximately equal in strength to each other, and as they circulate in opposite directions in their respective armatures they tend to neutralize each other's self-inductive and reactive effects. The result of the neutralizing effect on the primary is increased efficiency, a more stable neutral line, and a reduced sparking at the commutator.

The essential feature of my invention being simply an energized field-magnet adapted to produce a rotating field of force and a closed circuited armature within the influence of such field, it is obvious that the invention may be carried out in a variety of forms without departing from the spirit of the invention. For example, the field-magnet may have two or more poles and may be of any convenient design for rotary purposes, while the secondary armature may be either of the drum, cylinder, ring, or disk type.

I would also state that within the limits defined by the description of the nature and purpose of my invention the terms "armature" and "field-magnet" are interchangeable.

Having now described my invention, what I claim is—

1. The combination with a motor having an armature and field-magnet, of a secondary armature acted upon inductively by a rotating field of force produced by the rotating element of the motor, as set forth.

2. The combination with a motor having an armature and field-magnet, of a secondary armature with closed circuit in a rotary field of force produced by the rotating element of the motor, as set forth.

3. The combination with a motor having an armature and field-magnet, of a secondary armature, a circuit thereon, and means for varying the resistance of the armature-circuit, the said secondary armature being in a rotary field of force produced by the rotating element of the motor, as set forth.

4. The combination with a stationary primary armature, and a rotating field-magnet, of a secondary armature with circuit capable of being closed and varied in resistance, in the rotary field produced by the said field-magnet, as set forth.

5. The combination with the stationary element $a$ and the rotating element $b$ of a motor, of a cylinder $e$ interposed between the two, the said cylinder being slotted longitudinally, and means for varying the resistance of the circuit of said cylinder.

6. The combination with the armature $a$ and rotating field-magnet $b$, of the longitudinally-slotted cylinder $e$ intermediate to the two, the end of the cylinder being beveled off to a thin edge, and a circuit-closer for completing the circuit of the cylinder and varying the resistance thereof by a movement in contact therewith along the beveled portion, as set forth.

7. The combination with the armature $a$ and rotating field-magnet $b$, of the slotted cylinder $e$, having a beveled end, a circuit-closer movable over the beveled portion of the cylinder, and a magnet for shifting the circuit-closer to vary the resistance of the cylinder.

8. The combination with the stationary armature $a$, and the rotating field-magnet $b$, of the slotted rotatable cylinder $e$, a circuit-closer rotating with the cylinder, and a shifting magnetic coupler for operating the said circuit-closer, as set forth.

ARCHIE B. McMILLAN.

Witnesses:
 EDWIN B. HOPKINSON,
 M. LAWSON DYER.